US012205753B2

(12) United States Patent
Asahi et al.

(10) Patent No.: US 12,205,753 B2
(45) Date of Patent: Jan. 21, 2025

(54) REACTOR

(71) Applicant: Panasonic Intellectual Property Management Co., Ltd., Osaka (JP)

(72) Inventors: Toshiyuki Asahi, Osaka (JP); Junichi Kotani, Hyogo (JP); Shigeyuki Inagaki, Hyogo (JP); Hironori Nagasaki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 746 days.

(21) Appl. No.: 17/428,303

(22) PCT Filed: Mar. 19, 2020

(86) PCT No.: PCT/JP2020/012319

§ 371 (c)(1),
(2) Date: Aug. 4, 2021

(87) PCT Pub. No.: WO2020/203353

PCT Pub. Date: Oct. 8, 2020

(65) Prior Publication Data

US 2022/0108830 A1 Apr. 7, 2022

(30) Foreign Application Priority Data

Mar. 29, 2019 (JP) ................................ 2019-068224

(51) Int. Cl.
*H01F 17/04* (2006.01)
*H01F 27/02* (2006.01)
(Continued)

(52) U.S. Cl.
CPC ....... *H01F 27/2823* (2013.01); *H01F 27/027* (2013.01); *H01F 27/24* (2013.01); *H01F 27/29* (2013.01); *H01F 37/00* (2013.01)

(58) Field of Classification Search
CPC ................................................. H01F 27/2823
(Continued)

(56) References Cited

U.S. PATENT DOCUMENTS

2012/0056704 A1 3/2012 Nagano et al.
2012/0280779 A1 11/2012 Shih

FOREIGN PATENT DOCUMENTS

JP 2012-054484 3/2012
JP 5502672 B 5/2014
(Continued)

OTHER PUBLICATIONS

English translation of CN101989485 (Year: 2011).*
International Search Report of PCT application No. PCT/JP2020/012319 dated Jun. 2, 2020.

*Primary Examiner* — Ronald Hinson
(74) *Attorney, Agent, or Firm* — Rimon P.C.

(57) ABSTRACT

A reactor includes a core and first and second coils wound around the core about first and second center axes extended in a first direction, respectively. The core includes first and second core legs disposed inside the first and second coils, respectively. The first and second coils are arranged in a second direction perpendicular to the first direction. The first coil includes a first wound-wire part wound around the first core leg and two first terminal parts extended from both end portions of the first wound-wire part, respectively. The second coil includes a second wound-wire part wound around the second core leg and two second terminal parts extended from both end portions of the second wiring wire part, respectively. The second coil has the same shape and the same dimension as the first coil.

13 Claims, 8 Drawing Sheets

(51) Int. Cl.
*H01F 27/24* (2006.01)
*H01F 27/28* (2006.01)
*H01F 27/29* (2006.01)
*H01F 37/00* (2006.01)

(58) Field of Classification Search
USPC .......................................................... 336/221
See application file for complete search history.

(56) References Cited

FOREIGN PATENT DOCUMENTS

| | | |
|---|---|---|
| JP | 2018-029122 | 2/2018 |
| JP | 2018-029124 | 2/2018 |
| WO | 2018/173900 | 9/2018 |

* cited by examiner

REACTOR

CROSS-REFERENCE TO RELATED APPLICATIONS

This application is a U.S. national stage application of the PCT international application No. PCT/JP2020/012319 filed on Mar. 19, 2020, which claims the benefit of foreign priority of Japanese patent application No. 2019-068224 filed on Mar. 29, 2019, the contents all of which are incorporated herein by reference.

TECHNICAL FIELD

The present disclosure relates to a reactor including a core.

BACKGROUND ART

PTL1 discloses a conventional composite transformer (reactor) including a single transformer and plural inductors.

The composite transformer disclosed in PTL1 includes plural wound wires, a transformer core, and plural inductor cores. The transformer core includes plural transformer magnetic legs extended in an axial direction of the wound wires and allowing the wires wound around the leg. Each of the inductor cores includes an inductor magnetic leg extended in the axial direction of the wound wires and allowing a wire wound around the leg. The inductor cores are disposed such that the inductor magnetic leg is adjacent to the transformer magnetic leg in a direction perpendicular to the axis of the winding wires. The winding wires are wound around the magnetic legs including the transformer magnetic legs and the inductor magnetic legs. Magnetic flux is generated in the transformer magnetic legs and the inductor magnetic legs by applying current.

CITATION LIST

Patent Literature

PTL1: Japanese Patent Laid-Open Publication No. 2012-54484

SUMMARY

A reactor includes a core and first and second coils wound around the core about first and second center axes extended in a first direction, respectively. The core includes first and second core legs disposed inside the first and second coils, respectively. The first and second coils are arranged in a second direction perpendicular to the first direction. The first coil includes a first wound-wire part wound around the first core leg and two first terminal parts extended from both end portions of the first wound-wire part, respectively. The second coil includes a second wound-wire part wound around the second core leg and two second terminal parts extended from both end portions of the second wiring wire part, respectively. The second coil has the same shape and the same dimension as the first coil.

DETAIL DESCRIPTION OF PREFERRED EMBODIMENT

Exemplary embodiments of the present disclosure will be described below with reference to the drawings. However, the exemplary embodiments described below are merely examples of various embodiments of the present disclosure. Various modifications according to design or the like can be made to the exemplary embodiments below within the intention of the present disclosure.

(1) Outline

Figure 1:
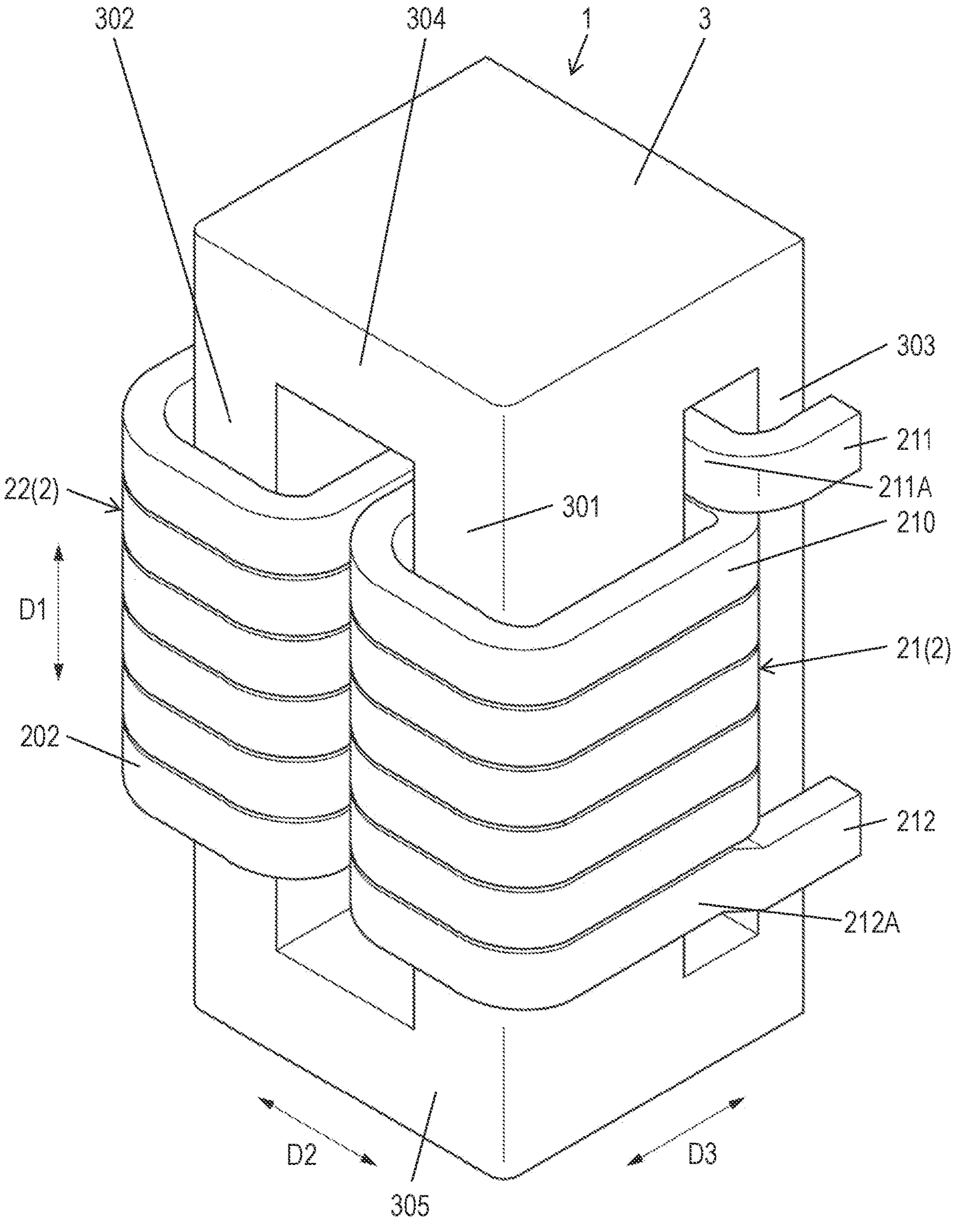
FIG. 1 is a perspective view of a reactor in accordance with a first exemplary embodiment.

FIG. 1 is a perspective view of reactor 1 in accordance with a first exemplary embodiment. FIG. 2A, FIG. 2B, FIG. 2C, and FIG. 2D are a plan view, a front view, a side view, a rear view of reactor 1, respectively. Reactor 1 is a two-phase magnetic coupling reactor, and has a magnetic coupling function of magnetically coupling coils 21 and 22 to each other, and an inductor function of storing and discharging magnetic energy in coils 21 and 22.

Figure 2A:
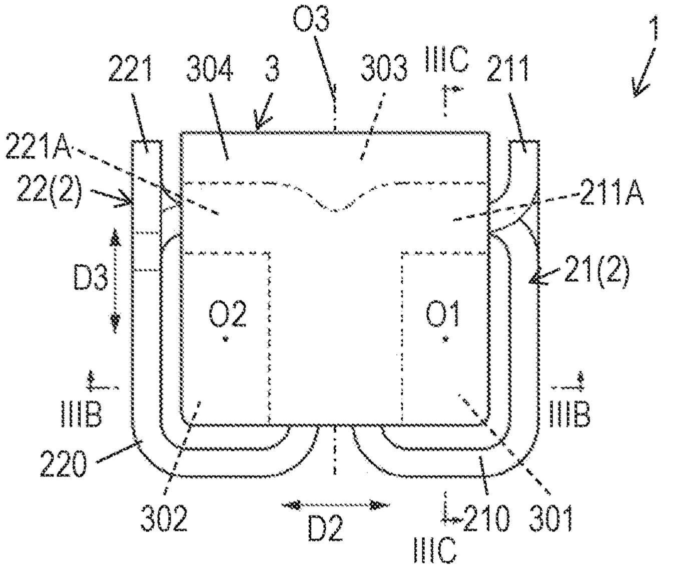
FIG. 2A is a plan view of the reactor shown in FIG. 1.
Figure 2B:
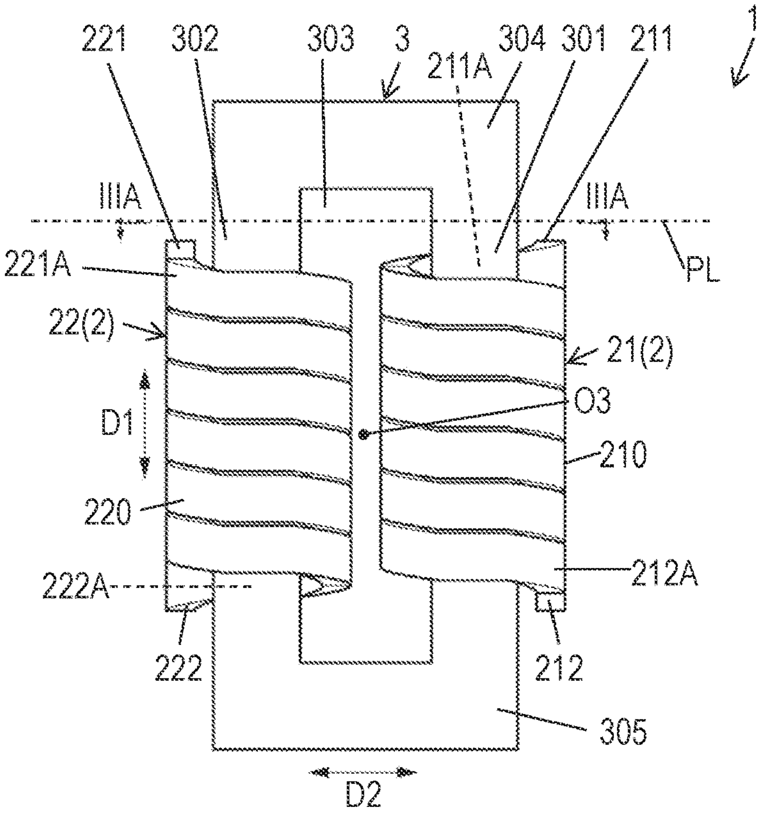
FIG. 2B is a front view of the reactor shown in FIG. 1.
Figure 2C:
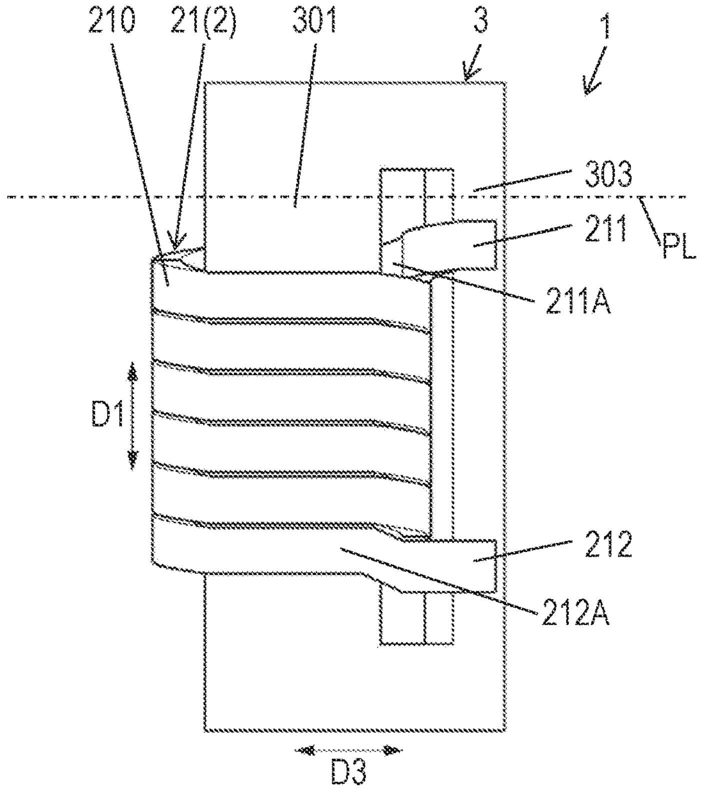
FIG. 2C is a side view of the reactor shown in FIG. 1.
Figure 2D:
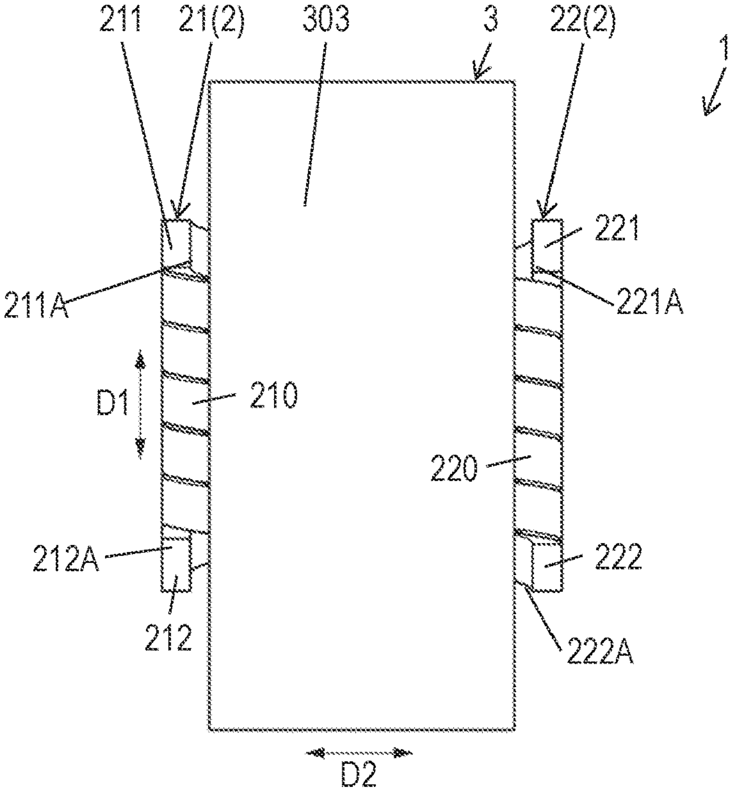
FIG. 2D is a rear view of the reactor shown in FIG. 1.

Reactor 1 includes core 3 and coils 21 and 22. Core 3 includes core legs 301 and 302. Coil 21 is wound around core 3 about center axis O1 extended in direction D1. Coil 22 is wound around core 3 about center axis O2 extended in direction D1. Center axis O1 of coil 21 is parallel to center axis O2 of coil 22. Coils 21 and 22 are arranged in direction D2 perpendicular to center axis O1 of coil 21, i.e., direction D1. Coil 21 includes wound-wire part 210 wound around core leg 301 and two terminal parts 211 and 212 extended from wound-wire part 210. Wound-wire part 210 has both end portions 211A and 212A. Wound-wire part 210 is wound around core leg 301 from one end portion 211A out of both end portions 211A and 212A to other end portion 212A out of both end portions 211A and 212A. Terminal parts 211 and 212 are extended from both end portions 211A and 212A of wound-wire part 210, respectively. Coil 22 includes wound-wire part 220 wound around core leg 302, and two terminal parts 221 and 222 extended from wound-wire part 220. Wound-wire part 220 has both end portions 221A and 222A. Wound-wire part 220 is wound around core leg 302 from one end portion 221A out of both end portions 221A and 222A to other end portion 222A out of both end portions 221A and 222A. Terminal parts 221 and 222 are extended from both end portions 221A and 222A of wound-wire part 220, respectively. Coil 22 has the same shape and the same dimensions as coil 21. Coils 21 and 22 constitute coil part 2. FIG. 2A is a schematic view of reactor 1 when viewed in direction D1. FIG. 2B is a schematic view of reactor 1 when viewed in direction D3 perpendicular to directions D1 and D2. FIG. 2C is a schematic view of reactor 1 when viewed in direction D2. FIG. 2D is a schematic view of reactor 1 when viewed in direction D3.

In accordance with the embodiment, coils 21 and 22 have the same shape and the same dimensions, therefore not requiring to prepare two types of coils different from each other as coils 21 and 22. This configuration facilitates manufacturing of reactor 1. In accordance with the embodiment, one terminal part 211 of coil 21 and one terminal part 221 of coil 22 are disposed at one of both edges of coil part 2 which is a combination of coils 21 and 22 along direction D1. Another terminal part 212 of coil 21 and another terminal part 222 of coil 22 are disposed at the other of both edges of coil part 2 along direction D1. Therefore, reactor 1 in accordance with the embodiment is easily connectable to an external circuit. When reactor 1 is mounted onto a wiring board, terminal part 211 of coil 21 and terminal part 221 of coil 22 are connected to a circuit, and terminal part 212 of coil 21 and terminal part 222 of coil 22 are connected to another circuit, thereby simplifying routing of wiring on the wiring board. This configuration allows an apparatus equipped with reactor 1 to have a small size. In accordance with the embodiment, coils 21 and 22 of rector 1 having the same shape reduces variations in current (current waveform) passing through coil 21 and current (current waveform) passing through coil 22.

The composite transformer disclosed in PTL1 requires a complicated connection with an external circuit, depending on positions of terminal parts extended from the plural coils. This may result in a complicated circuit configuration.

In the present disclosure, the "same shape" does not necessarily mean shapes completely identical, and is acceptable as long as shapes are similar to an extent to be considered the same in the field of coils. For example, coils 21 and 22 having the same shape refer to coils whose outlines substantially match when overlapping, coils fabricated in different manufacturing lots but the same manufacturing equipment is used, coils fabricated to have the same shape using materials containing different constituents, and coils whose cross-sectional shapes of conductive wires forming coils 21 and 22 are different. Similarly, the "same dimensions" do not necessarily mean dimensions completely identical as long as dimensions are similar to an extent to be considered the same in the field of coils. For example, coils 21 and 22 having the same dimensions refer to coils with dimensions whose outlines substantially match when overlapping, coils fabricated in different manufacturing lots but the same manufacturing equipment is used, coils fabricated to have the same dimensions using materials containing different constituents, and coils whose cross-sectional dimensions of conductive wires forming coils 21 and 22 are different.

Reactor 1 in accordance with the embodiment is employed in power supply circuits provided in, for example, vehicles, power conditioners for residence and non-residence, and electronic apparatuses.

(2) Configuration of Reactor 1

(2-1) First Exemplary Embodiment

Figure 3A:
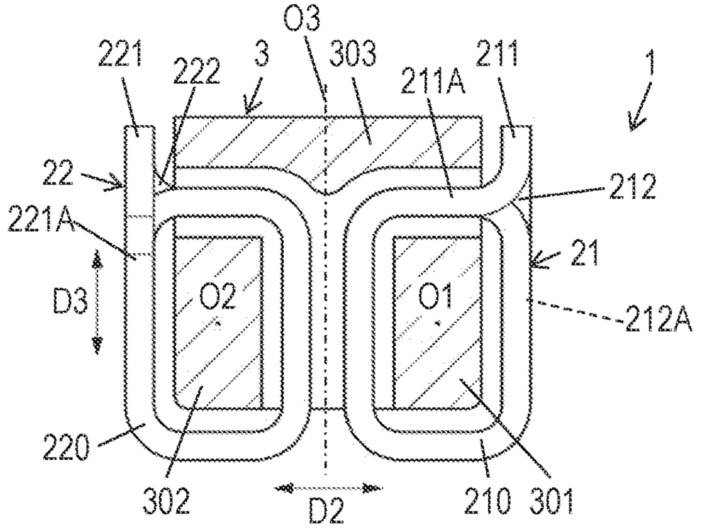
FIG. 3A is a sectional view of the reactor along line IIIA-IIIA shown in FIGS. 2A-2D.
Figure 3B:
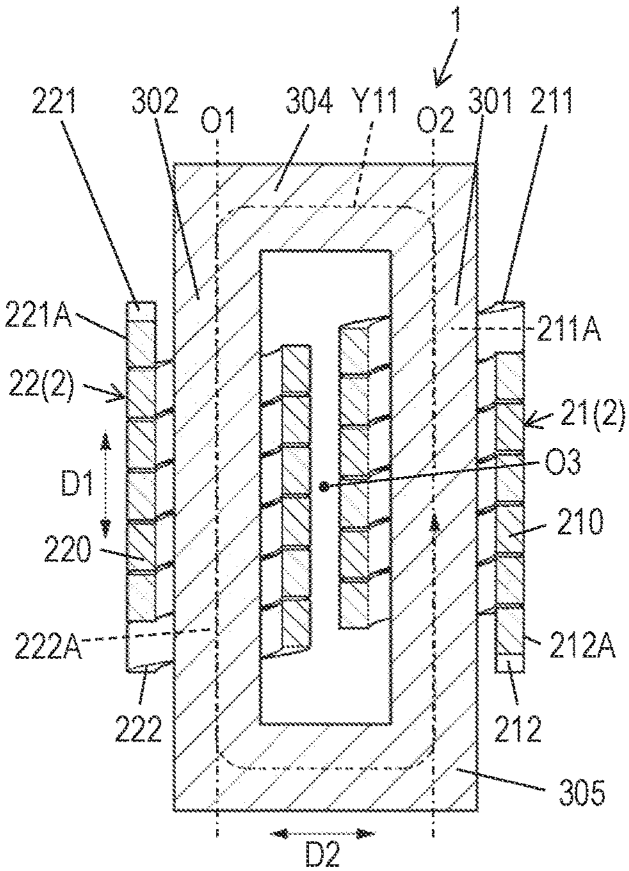
FIG. 3B is a sectional view of the reactor along line IIIB-IIIB shown in FIGS. 2A-2D.
Figure 3C:
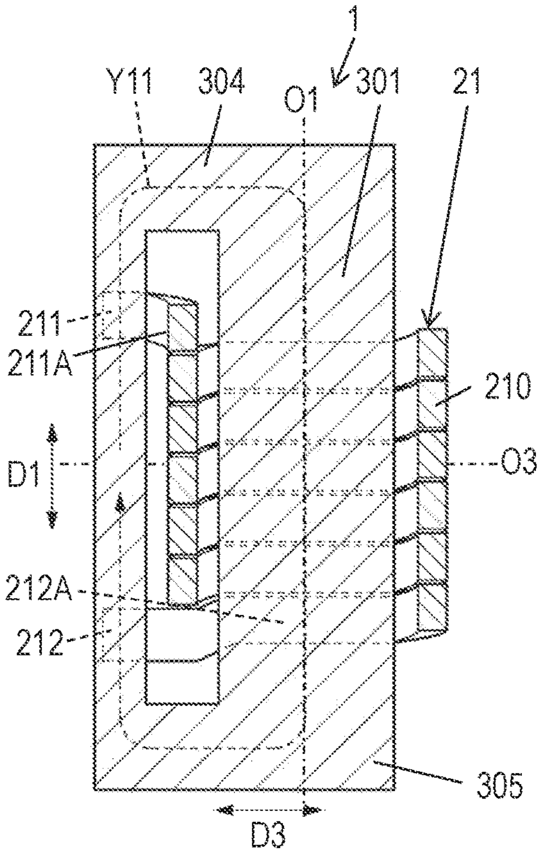
FIG. 3C is a sectional view of the reactor along line IIIC-IIIC shown in FIGS. 2A-2D.

A configuration of reactor 1 in accordance with a first exemplary embodiment of the present disclosure will be detailed below. FIG. 3A is a sectional view of reactor 1 along line IIIA-IIIA shown in FIGS. 2A-2D. FIG. 3B is a sectional view of reactor 1 along line IIIB-IIIB shown in FIGS. 2A-2D. FIG. 3C is a sectional view of reactor 1 along line IIIC-IIIC shown in FIGS. 2A-2D.

In reactor 1, core 3 magnetically couples coils 21 and 22.to each other. Core 3 stores or discharges magnetic energy generated by current passing through one or both of coils 21 and 22.

Core 3 includes core legs 301, 302, and 303, and connection parts 304 and 305. As shown in FIG. 1, core legs 301, 302, and 303 are unitarily formed as core 3 in accordance with the embodiment. Core legs 301, 302, and 303 are extended in direction D1. Core legs 301 and 302 are arranged in direction D2. Core leg 303 and combined core legs 301 and 302 are arranged in direction D3.

Connection parts 304 and 305 are arranged in direction D1 with a space in between. Respective one ends of core legs 301, 302, and 303 along direction D1 are connected to connection part 304. Respective another ends of core legs 301, 302, and 303 along direction D1 are connected to connection part 305. In other words, core legs 301, 302, and 303 are connected to one another with connection parts 304 and 305.

Core leg 301 is disposed inside coil 21. Coil 21 is wound around core leg 301. Core leg 302 is disposed inside coil 22. Coil 22 is wound around core leg 302. Core leg 303 is disposed outside coils 21 and 22. Neither coils 21 nor 22 is wound around core leg 303.

Cross sections of core legs 301 and 302 in plane PL perpendicular to direction D1 have substantially rectangular shapes in core 3 shown in FIG. 3A. Each cross section does not necessarily have the rectangular shape, and, for example, may have a rectangular shape with at least partially round periphery or another shape, such as a circular shape. Connection parts 304 and 305 have, for example, rectangular shapes, as shown in FIG. 2A when viewed in direction D1, but may have a plate shape with four round corners, but not limited to this shape.

In accordance with the embodiment, core 3 is unitarily formed. Here, "integrally" is not limited to integral forming, and includes a structure of bonding two or more components to one another with adhesive. Core 3 is preferably made of metal magnetic material. More specifically, core 3 is, for example, made of power magnetic core (dust core) made of alloy material of iron, silicon, and aluminum (Fe, Si, Al), alloy material of iron and nickel (Fe, Ni), or alloy material of iron and silicon (Fe, Si).

As described above, coils 21 and 22 have the same shape in accordance with the embodiment. Coil 21 is made of a conductive wire having a rectangular cross section wound about core leg 301 (center axis O1) around core leg 301 extended along center axis O1 in direction D1, centered about core leg 301 (center axis O1). Coil 22 made of a conductive wire having a rectangular cross section wound about core leg 302 (center axis O2) around core leg 302 along center axis O2 extended in direction D1. A longitudinal direction of coils 21 and 22 in which coils 21 and 22 are extended slenderly is direction D3 when viewed in the direction of center axes O1 and O2, i.e., in direction D1. In other words, each of coils 21 and 22 has a rectangular shape with longer sides extended in direction D3 and four round corners. The number of turns of coil 21 is the same as the number of turns of coil 22. The number of turns of each of coils 21 and 22 can be changed as appropriate according to design or the like. The number of turns of coil 21 may be different from the number of turns of coil 22. However, coil 21 and coil 22 preferably have the same number of turns from a viewpoint of suppressing variations in current waveforms of reactor 1, from a viewpoint of controlling current passing through reactor 1, and from a viewpoint of improving easy mounting of reactor 1. Coils 21 and 22 may not necessarily made of the conductive wire having the rectangular cross section, but may be made of a conductive wire with a circular cross section.

In accordance with the embodiment, both end portions 211A and 212A of wound-wire part 210 of coil 21 are arranged in direction D1 of center axis O1. Both end portions 211A and 212A of wound-wire part 210 are positioned opposite to coil 22 with respect to center axis O1, and face core leg 303.

In accordance with the embodiment, both end portions 221A and 222A of wound-wire part 220 of coil 22 are arranged in direction D1 of center axis O2. Both end portions 221A and 222A of wound-wire part 220 are positioned opposite to coil 21 with respect to center axis O2, and face core leg 303.

In accordance with the embodiment, coil part 2 constituted by coils 21 and 22 has two-fold rotational symmetry about axis O3 extended between coils 21 and 22. Axis O3 is perpendicular to center axis O1 of coil 21, i.e., direction D1. Axis O3 is perpendicular to directions D1 and D2, and extended in direction D3. Axis O3 preferably passes through the midpoint of a line segment which connects center axis O1 to center axis O2 and which is extended in direction D2, but is not limited to the midpoint.

As shown in FIGS. 1-3C, terminal part 211 of coil 21 is extended in direction D2 from end portion 211A of wound-wire part 201 and bent in direction D3. Terminal part 212 is extended substantially straight in direction D3 from end portion 221A opposite to end portion 211A of wound-wire part 210. Terminal part 221 of coil 22 is extended substantially straight in direction D3 from end portion 221A of wound-wire part 220. Terminal part 222 is extended in direction D2 from end portion 222A opposite to end portion 221A of wound-wire part 220 and is bent in direction D3.

Therefore, terminal part 211 of coil 21 coincides with terminal part 222 of coil 22 when turned about axis O3 by half. Terminal part 212 of coil 21 coincides with terminal part 221 of coil 22 when turned about axis O3 by half.

Accordingly, terminal part 211 of coil 21 and terminal part 221 of coil 22 face each other across core leg 303 outside core leg 303 of core 3, and are arranged in direction D3. Terminal part 212 of coil 21 and terminal part 222 of coil 22 face each other across core leg 303 outside core leg 303 of core 3, and are arranged in direction D3. For example, as shown in FIG. 2D, in reactor 1, two terminal parts 211 and 212 of coil 21 and two terminal parts 221 and 222 of coil 22 are all disposed on the same side of core 3 outside core leg 303.

Figure 3D:
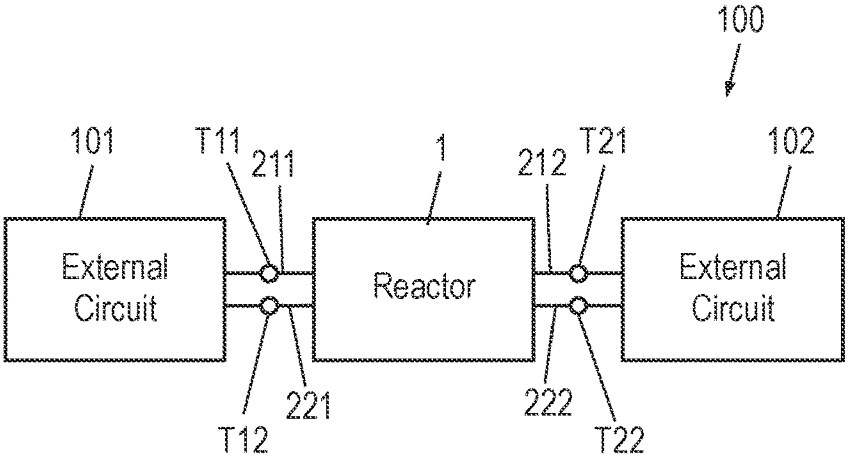
FIG. 3D is a circuit diagram of a power supply circuit including the reactor in accordance with the first embodiment.

FIG. 3D is a circuit diagram of power supply circuit 100 including reactor 1. In power supply circuit 100, terminal part 211 of coil 21 and terminal part 221 of coil 22 of reactor 1 are connected to the same external circuit 101 while terminal part 212 and terminal part 222 are connected to the same external circuit 102. Terminal part 211 of coil 21 of reactor 1 is connected to input terminal T11 connected to external circuit 101, and terminal part 221 of coil 22 is connected to input terminal T12 connected to external circuit 101. Terminal part 212 of coil 21 of reactor 1 is connected to output terminal T21 connected to external circuit 102, and terminal part 222 of coil 22 is connected to output terminal T22 connected to external circuit 102.

Figure 3E:
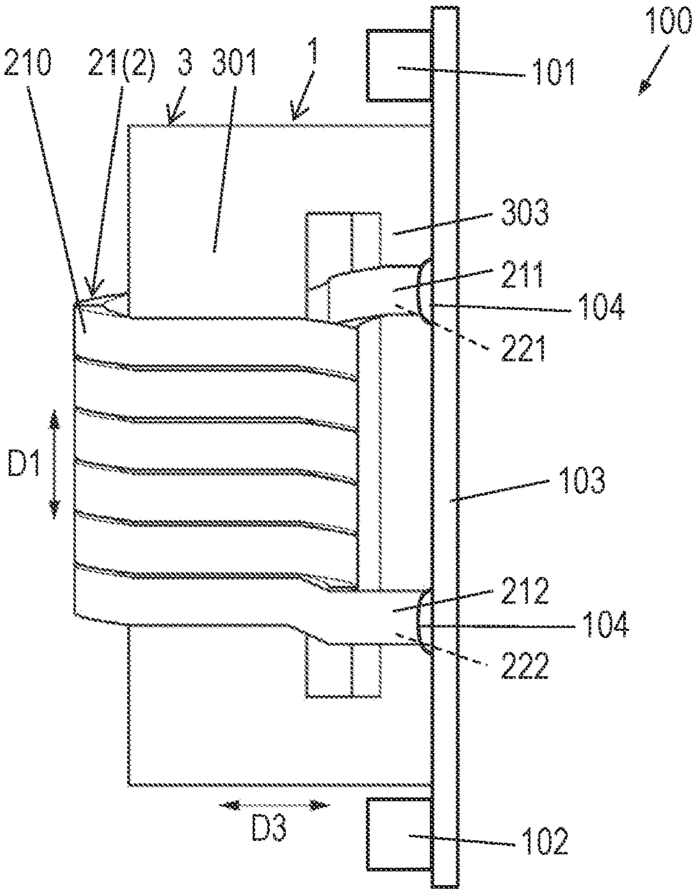
FIG. 3E is a side view of the power supply circuit shown in FIG. 3D.

FIG. 3E is a side view of power supply circuit 100. Power supply circuit 100 further includes circuit board 103 on which reactor 1 and external circuits 101 and 102 are mounted. Terminal parts 211, 212, 221, and 222 of reactor 1 are connected to circuit board 103 with bonding material 104, such as solder. Since terminal parts 211, 212, 221, and 222 are extended from core 3 in the same direction with short intervals, terminal parts 211, 212, 221, and 222 are easily connected to circuit board 3 electrically uniformly. In Reactor 1, terminal part 211 of coil 21 and terminal part 221 of coil 22 connected to one external circuit 101 face the same direction on the same side with respect to reactor 1. Terminal part 212 of coil 21 and terminal part 222 of coil 22 connected to one external circuit 102 face the same direction on the same side with respect to reactor 1. Therefore, reactor 1 is easily connected to external circuits 101 and 102.

Core 3 includes a coupling magnetic path that magnetically couples coils 21 and 22 to each other. The coupling magnetic path is constituted by core legs 301 and 302 and connection parts 304 and 305. Core 3 further includes a non-coupling magnetic path that passes through magnetic flux generated by coil 21. The non-coupling magnetic path is constituted by core legs 301 and 303 and connection parts 304 and 305. Core 3 further includes a non-coupling magnetic path that passes through magnetic flux generated by coil 22 (FIG. 3B and FIG. 3C). This non-coupling magnetic path is constituted by core legs 302 and 303 and connection parts 304 and 305. For example, core 3 generates magnetic flux Y11, as shown in FIG. 3B and FIG. 3C, when current flow in coil 21. Magnetic flux Y11 is conceptually illustrated, and therefore magnetic flux that passes through the non-coupling magnetic path is not limited to magnetic flux Y11.

The direction of direct-current (DC) magnetic flux generated by coils 21 and 22 depends on winding directions of coils 21 and 22 and directions of DC currents flowing in coils 21 and 22. Here, the DC magnetic flux refers to magnetic flux generated by DC currents flowing in coils 21 and 22. One terminal parts 211 and 221 of coils 21 and 22 are electrically connected to connection parts T11 and T22, respectively, that are input terminals on a high potential side of external circuit 101. Other terminal parts 212 and 222 of coils 21 and 22 are electrically connected to connection parts T21 and T22, respectively, that are input terminals on a low potential side of external circuit 102 (FIG. 3D). In the coupling magnetic path, the direction of DC magnetic flux generated by energized coil 21 and the direction of DC magnetic flux generated by energized coil 22 are opposite to each other. Therefore, the DC magnetic flux generated by coil 21 and the DC magnetic flux generated by coil 22 are in directions opposite to each other, thus being canceled.

Coils 21 and 22 are thus magnetically coupled to each other by the coupling magnetic path formed in core 3. In other words, core 3 magnetically couples coils 21 and 22 to each other. Core 3 has a magnetic coupling function to magnetically couple coils 21 and 22 to each other. For example, core 3 stores magnetic flux, as magnetic energy, that passes through non-coupling magnetic path in magnetic flux generated by coil 21. Core 3 thus has an inductor function to store or discharge magnetic energy generated by coil 21.

The above describes the case where current passes through coil 21. Also, in the case where current passes through coil 22, core 3 stores magnetic flux, as magnetic energy, that passes through the non-coupling magnetic path in magnetic flux generated by coil 22. In other words, core leg 302 has an inductor function to store or discharge magnetic energy generated by coil 22.

(2-2) Second Exemplary Embodiment

Figure 4:
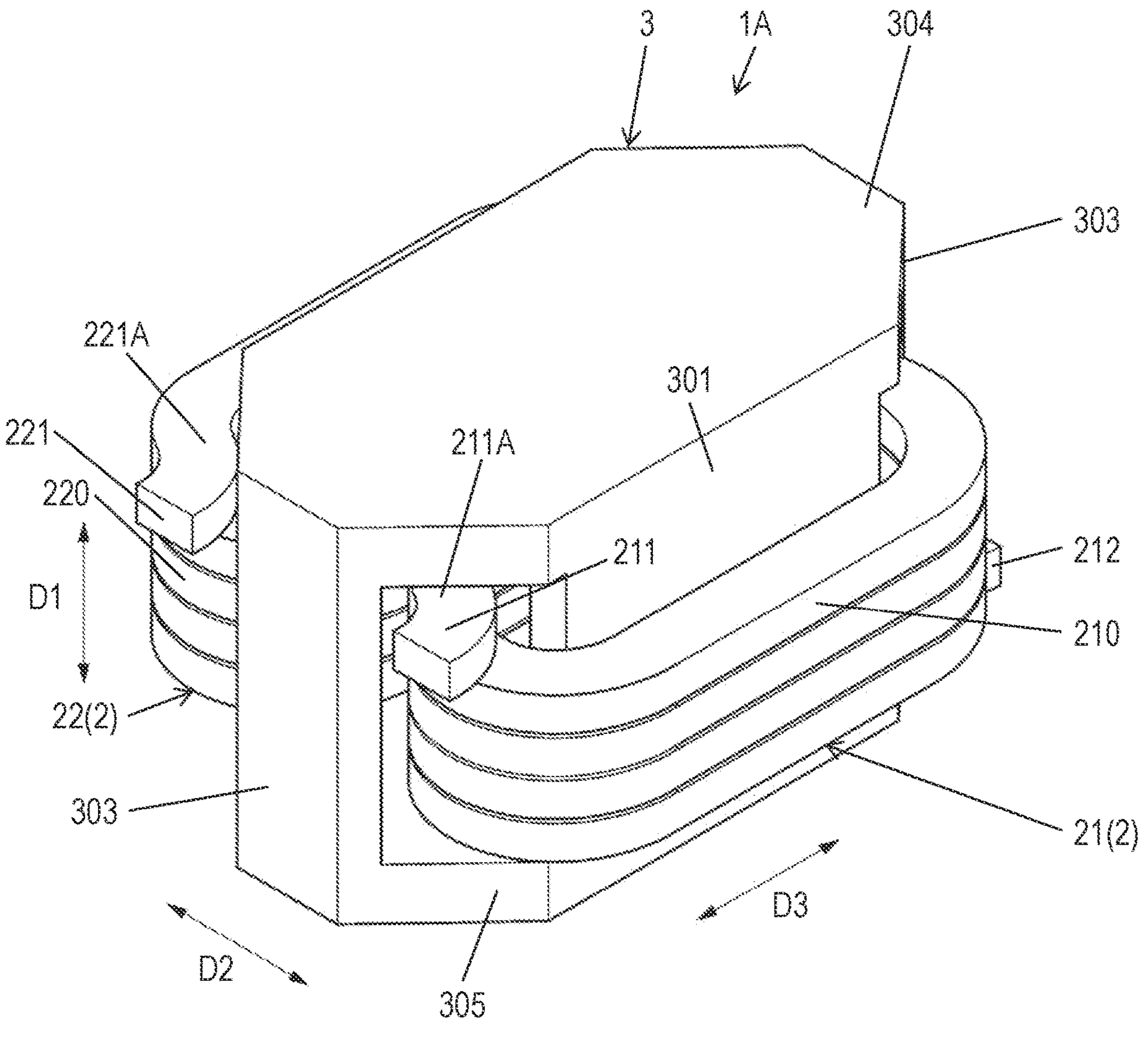
FIG. 4 is an appearance perspective view of a reactor in accordance with a second exemplary embodiment.
Figure 5A:
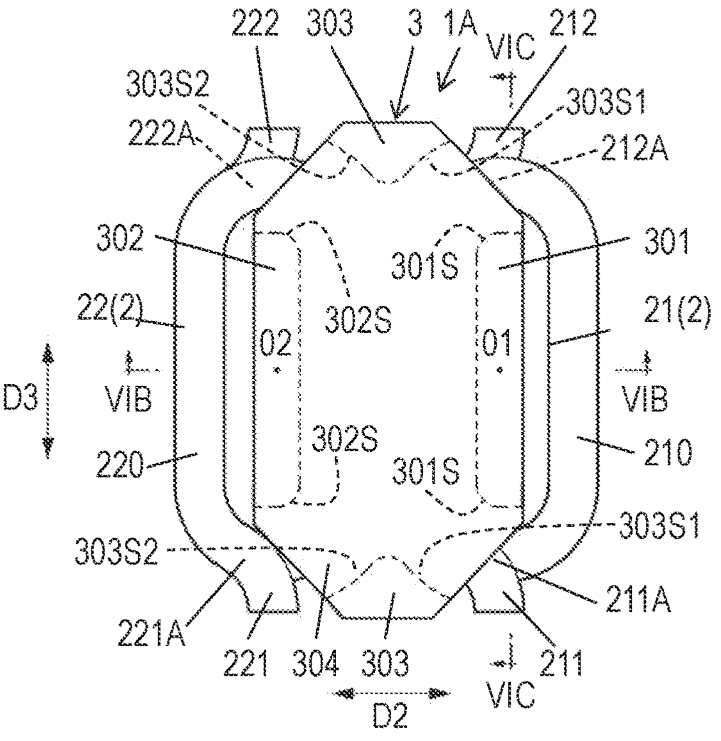
FIG. 5A is a plan view of the reactor shown in FIG. 4.
Figure 5B:
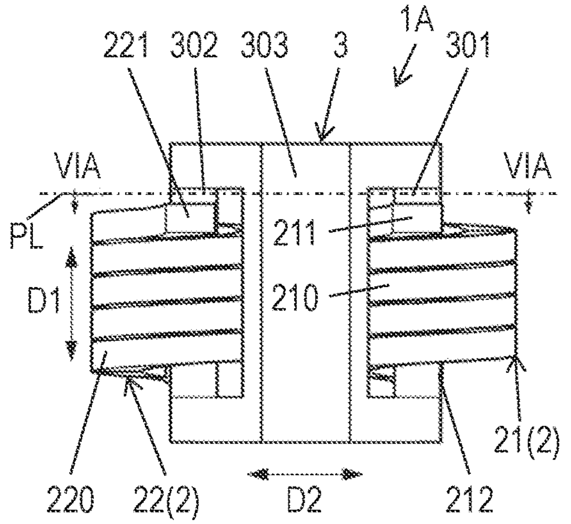
FIG. 5B is a front view of the reactor shown in FIG. 4.
Figure 5C:
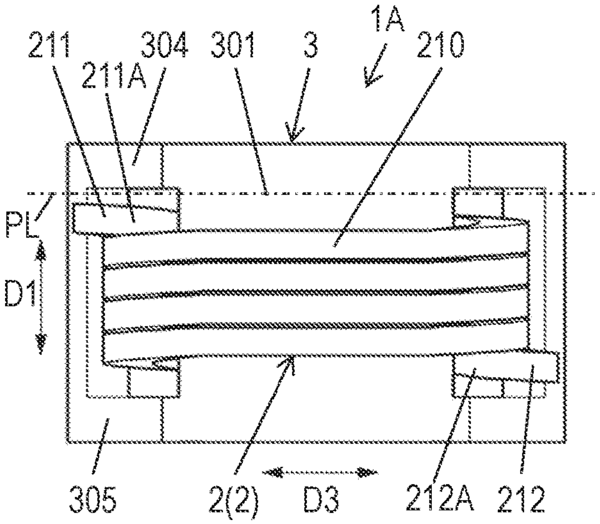
FIG. 5C is a side view of the reactor shown in FIG. 4.
Figure 6A:
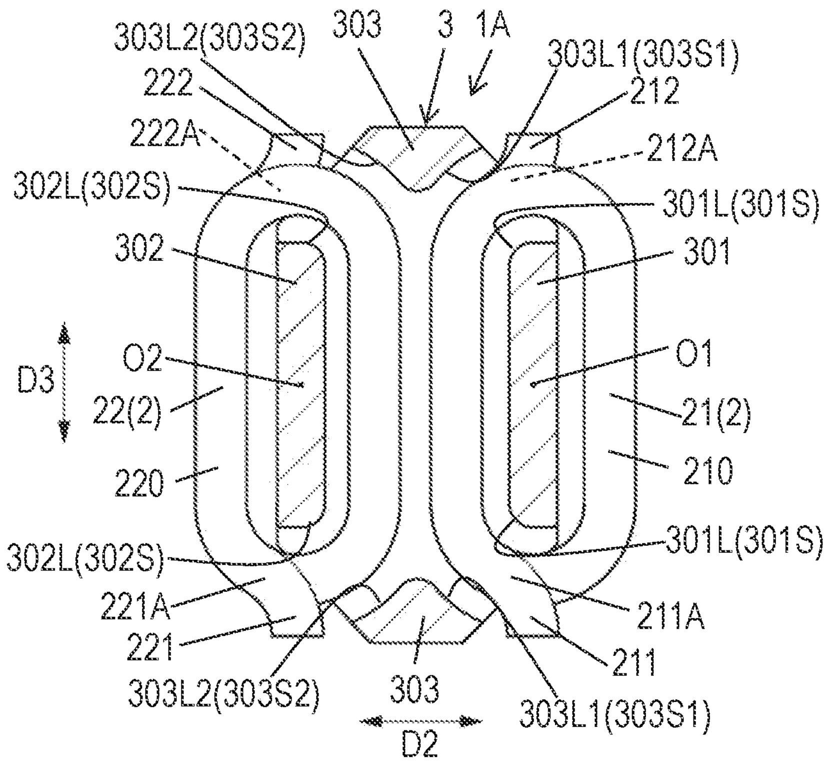
FIG. 6A is a sectional view of the reactor along line VIA-VIA shown in FIGS. 5A-5C.
Figure 6B:
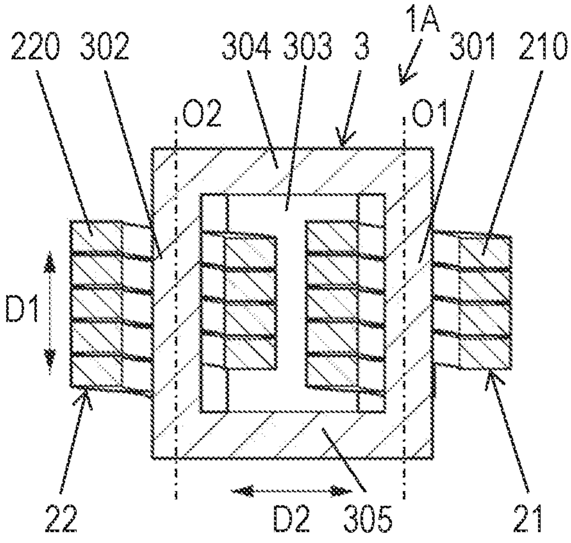
FIG. 6B is a sectional view of the reactor along line VIB-VIB shown in FIGS. 5A-5C.
Figure 6C:
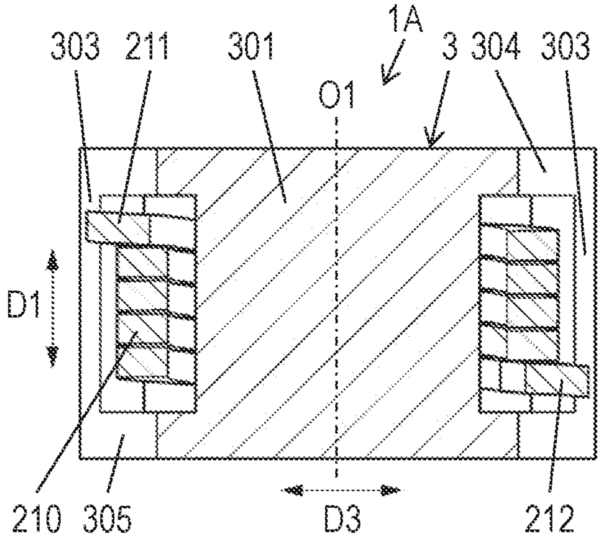
FIG. 6C is a sectional view of the reactor along line VIC-VIC shown in FIGS. 5A-5C.

FIG. 4 is a perspective view of reactor 1A in accordance with a second exemplary embodiment. FIG. 5A, FIG. 5B, and FIG. 5C are a plan view, a front view, and a side view of reactor 1A, respectively. FIG. 6A is a sectional view of reactor 1A along line VIA-VIA shown in FIGS. 5A-5C. FIG. 6B is a sectional view of reactor 1A along line VIB-VIB shown in FIGS. 5A-5C. FIG. 6C is a sectional view of reactor 1A along line VIC-VIC shown in FIGS. 5A-5C. Components identical to those of reactor 1 in accordance with the first embodiment are denoted by the same reference numerals, and their description will be omitted.

Reactor 1A in accordance with the embodiment also includes core 3 and coils 21 and 22. Coils 21 and 22 constitute coil part 2. Coils 21 and 22 of coil part 2 are wound about center axes O1 and O2 extended in direction D1, respectively. Coils 21 and 22 are arranged in direction D2 perpendicular to direction D1. Direction D3 is perpendicular to directions D1 and D2.

Core 3 includes core legs 301, 302, and 303 and connection parts 304 and 305. As shown in FIG. 4, core legs 301, 302, and 303 are unitarily formed in core 3 in accordance with the embodiment. Core legs 301, 302, and 303 are extended in direction D1. Core legs 301 and 302 are arranged in direction D2. Core leg 303 and combined core legs 301 and 302 are arranged in direction D3.

When viewed in direction D1, each of connection parts 304 and 305 has an octagonal shape with two longer sides extended in direction D3 opposite to each other, two shorter sides shorter than the longer sides extended in direction D2 and opposite to each other, and four oblique sides connecting the longer sides to the shorter sides (FIG. 5A).

Connection parts 304 and 305 are arranged in direction D1 with across a space in between. Respective one ends of core legs 301, 302, and 303 along direction D1 are connected to connection part 304. Respective another ends of core legs 301, 302, and 303 along direction D1 are connected to connection part 305. In other words, core legs 301, 302, and 303 are connected to each other with connection parts 304 and 305.

Both ends of core legs 301 are connected to one longer side of connection part 304 and another longer side of connection part 305 opposite to the one longer side of connection part 304 along direction D1. Both ends of core leg 302 are connected to one longer side of connection part 304 different from the longer side connected to core leg 301 and another longer side of connection part 305 different from the longer side connected to core leg 301 opposite to the longer side of connection part 304 along direction D1. Both ends of core leg 303 are connected to one shorter side of connection part 304 and another shorter side of connection part 305 opposite to the one shorter side of connection part 304. An opening connected to a space between connection parts 304 and 305 is formed between each oblique side of connection part 304 and corresponding one oblique side of connection part 305 opposite to the each oblique side of connection part 304 along direction D1.

Core leg 301 is disposed inside coil 21. Core leg 302 is disposed inside coil 22. Core leg 303 is disposed outside coils 21 and 22. In other words, core leg 303 is not disposed inside neither coils 21 nor 22.

Across section of each of core legs 301 and 302 perpendicular to direction D1 has a rectangular shape extended slenderly in direction D3, and is at least partially round in the periphery. The cross section may not necessarily have this shape. For example, the cross section may have another shape, such as a rectangular or circular shape.

In accordance with the embodiment, in core 3, contour 301L of surface 301S of core leg 301 facing core leg 303 appearing on a cross section of core leg 301 perpendicular to center axis O1 is a curve convex toward core leg 303, as shown in FIG. 5A and FIG. 6A. Contour 302L of surface 302S of core leg 302 facing core leg 303 appearing on a cross section of core leg 302 perpendicular to center axis O2 is a curve convex toward core leg 303. Contour 303L1 of surface 303S1 of core leg 303 facing core leg 301 appearing on a cross section of core leg 303 perpendicular to center axis O1 is recessed opposite to core leg 301. Contour 303L2 of surface 303S2 of core leg 303 facing core leg 302 appearing on the cross section core leg 303 perpendicular to center axis O2 is recessed opposite to core leg 302.

In other words, core leg 301 has surface 301S facing core leg 303. Contour 301L of surface 301S of core leg 301 on the cross section of core leg 301 in plane PL perpendicular to direction D1 is a curve convex toward core leg 303. Core leg 302 has surface 302S facing core leg 303. Contour 302L of surface 302S of core leg 302 on the cross section of core leg 302 in plane PL is a curve convex toward core leg 303. Core leg 303 has surface 303S1 and surface 303S2 facing surface 301S of core leg 301 and surface 302S of core leg 302, respectively. Contour 303L1 of surface 303S1 of core leg 303 on the cross section of core leg 303 in plane PL is a curve recessed opposite to core leg 301. Contour 303L2 of surface 303S2 of core leg 303 on the cross section of core leg 303 is a curve recessed opposite to of core leg 302.

This configuration of reactor 1A in accordance with the embodiment reduces parts thereof where magnetic flux is locally concentrated in core legs 301, 302, and 303. Reactor 1A is easily connected to an external circuit, and secures an effect of cancelling magnetic flux. Even when reactor 1A is connected to an external circuit, current can be easily controlled.

Contour 301L of surface 301S of core leg 301 may have an arcuate shape. Contour 303L1 of surface 303S1 of core leg 303 may have an arcuate shape concentric to the arcuate shape of contour 301L of surface 301S of core leg 301. Control 302L of surface 302S of core leg 302 may have an arcuate shape. Contour 303L2 of surface 303S of core leg 303 may have an arcuate shape concentric to the arcuate shape of contour 302L of surface 302S of core leg 302. This configuration reliably provides the above effect.

Contours 301L, 302L, 303L1, and 303L2 of surfaces 301S, 302S, 303S1, and 303S2 of core legs 301, 302, and 303 of core 3 may not necessarily have the above shapes.

Core 3 is unitarily formed, e.g. as shown in FIG. 4. Here, "unitarily" includes the bonding of plural components with adhesive, in addition to a unitarily-formed structure. Core 3 may be made of the same material as the first embodiment. Core 3 may have the same configuration as the first embodiment.

In accordance with the embodiment, coil 21 is made of a conductive wire which is wound around core leg 301 about core leg 301 and which has a rectangular cross section. Coil 22 is made of a conductive wire which is wound around core leg 302 about core leg 302 and which has a rectangular cross section.

The direction of center axis O1 of coil 21 and the direction of center axis O2 of coil 22 are both direction D1. Coils 21 and 22 are arranged in direction D2 perpendicular to direction D1 of center axis O1 of coil 21. As shown in FIGS. 4-6C, direction D2 is perpendicular to direction D3.

In accordance with the embodiment, terminal parts 211 and 212 of coil 21 are extended from end portions 211A and 212A of wound-wire part 210, respectively, in directions opposite to each other parallel with direction D3. Terminal parts 221 and 222 of coil 22 are extended from end portions 221A and 222A of wound-wire part 210, respectively, in directions opposite to each other parallel with direction D3 (FIGS. 4-6C). In other words, in accordance with the embodiment, when viewed in direction D1, terminal parts 211 and 212 of coil 21 of reactor 1A are extended from both end portions 211A and 212A of wound-wire part 210, respectively, in direction D3 perpendicular to direction D1 of center axis O1 of coil 21 and direction D2 in which coils 21 and 22 are arranged. Terminal parts 221 and 222 of coil 22 are extended from both end portions of wound-wire part 202 of coil 22, respectively, in a direction perpendicular to the direction of center axis O2 of coil 22 and the direction in which coil 21 and coil 22 are arranged.

In reactor 1A in accordance with the embodiment, coils 21 and 22 have the same shape. In accordance with the embodiment, coil 21 has translational symmetry with respect to coil 22 in a translational movement in direction D2 in which coils 21 and 22 are arranged. More specifically, as shown in FIGS. 4-6C, terminal parts 211 and 212 of coil 21 curve to be extended. Terminal parts 211 and 212 are positioned opposite to each other with respect to center axis O1 and arranged in direction D3, and are positioned opposite to each other with respect to an axis extended in direction D2 perpendicular to center axis O1 and arranged in direction D1. Terminal parts 221 and 222 of coil 22 curve to be extended opposite to each other with respect to center axis O2 in direction D3 and opposite to each other with respect to an axis extended direction D2 perpendicular to center axis O2 and are arranged in direction D1.

In other words, terminal part 211 of coil 21 translated in direction D2 coincides with terminal part 221 of coil 22. Terminal part 212 of coil 21 translated in direction D2 matches coincides with part 222 of coil 22.

Reactor 1A in accordance with the embodiment allows terminal part 211 of coil 21 and terminal part 221 of coil 22 to be located on the same side of core 3. Terminal part 212 of coil 21 and terminal part 222 of coil 22 are arranged on the same side of core and opposite to terminal parts 211 and 221.

Therefore, reactor 1A is connected to external circuits 101 and 102 of power supply circuit 100 shown in FIG. 3D instead of reactor 1 allows terminal part 211 of coil 21 and terminal part 221 of coil 22 to be on the same side to be connected to external circuit 101. Terminal part 212 of coil 21 and terminal part 222 of coil 22 are on the same side to be connected to another external circuit 102.

When connecting reactor 1A to the external circuit, as shown in FIG. 3D, terminal part 211 of coil 21 and terminal part 221 of coil 22 of reactor 1A are connected to the same external circuit (external circuit 101 in FIG. 3D), and terminal part 212 and terminal part 222 are connected to the same external circuit (external circuit 102 in FIG. 3D). More specifically, in reactor 1A, one terminal part 211 of coil 21 is connected to connection part T11 of external circuit 101, and one terminal part 221 of coil 22 is connected to connection part T12 of external circuit 101. Still more, in reactor 1A, another terminal part 212 of coil 21 is connected to connection part T21 of external circuit 102 and another terminal part 222 of coil 22 is connected to connection part T22 of external circuit 102. In reactor 1A, the terminal parts of coils 21 and 22 connected to external circuits 101 and 102 are directed in the same direction. Therefore, the terminal parts are easily connected to external circuits 101 and 102.

In accordance with the embodiment, connection parts 304 and 305 of core 3 have the four oblique sides. Therefore, terminal parts 211, 212, 221, and 222 of coils 21 and 22 are disposed outside of each of the openings in core leg 303. In other words, in accordance with the embodiment, both terminal parts of coils 21 and 22 are disposed outside core 3. As a result, each terminal part is disposed outside core 3 although coils 21 and 22 have the same shape in reactor 1A in accordance with the embodiment. This configuration simplifies a wiring route typically on a wiring board when reactor 1A is mounted typically on the wiring board and connected to external circuits 101 and 102. Accordingly, an apparatus equipped with reactor 1A have a small size. The shape of core 3 is not limited to the shape described above as long as the terminal parts of coils 21 and 22 are disposed outward from core 3.

(2-3) Modified Example

Modified examples of the first and second embodiments will be described below. The modified examples described below may be combined with the embodiments as appropriate.

In core 3 in reactors 1 and 1A, core leg 301, core leg 302, and core leg 303 are unitarily formed, but may be formed separately. For example, in the above example, core leg 301 and core leg 303 are configured to constitute both the coupling magnetic path and the non-coupling magnetic path. However, a core leg constituting the coupling magnetic path and another core leg constituting the non-coupling magnetic path may be configured separately. In the same way, core leg 302 and core leg 303 are configured to constitute both the coupling magnetic path and the non-coupling magnetic path. However, a core leg constituting the coupling magnetic path and another core leg constituting the non-coupling magnetic path may be configured separately. In this case, the two core legs configuring core leg 301 (core leg 302) may be bonded with adhesive. Core legs 301, 302, and 303 of core 3 may be configured with different materials from each other. For example, when reactor 1 is designed, transmittance of material of core leg 303 and transmittance of material of core legs 301 and 302 may be different to adjust a coupling coefficient.

Reactors 1 and 1A in accordance with the embodiments described above includes core legs 301 and 302 as the non-coupling magnetic path for providing the inductor function. However, only one of core legs 301 and 302 may be provided.

Connection parts 304 and 305 may have different shapes. For example, connection part 304 has a rectangular shape, and connection part 305 may have a shape, such as a polygonal shape, other than a rectangular shape.

Reactors 1 and 1A may further include a bobbin on which coils 21 and 22 are wound. Core legs 301 and 302 passes through the bobbin.

In reactors 1 and 1A, coils 21 and 22 may be integrally sealed with core 3 with a sealing material made of, e.g. resin. This configuration suppresses winding deviation of coils 21 and 22.

Core legs 301, 302, and 303 may not be continuously extended entirely. For example, core legs 301, 302, and 303 may be continuously extended partially.

REFERENCE MARKS IN THE DRAWINGS

1 reactor
21 coil (first coil)
22 coil (second coil)
210 wound-wire part (first wound-wire part)
220 wound-wire part (second wound-wire part)
211, 212 terminal part (first terminal part)
221, 222 terminal part (second terminal part)
3 core
301 core leg (first core leg)
302 core leg (second core leg)
303 core leg (third core leg)

The invention claimed is:

1. A reactor comprising:
a core;
a first coil wound around the core about a first center axis extended in a first direction; and
a second coil wound around the core about a second center axis extended in the first direction, wherein:
the core includes:
a first core leg disposed inside the first coil;
a second core leg disposed inside the second coil; and
a third core leg disposed outside the first coil and the second coil,
the first coil and the second coil are arranged in a second direction perpendicular to the first direction,
the first coil includes:
a first wound-wire part having both end portions, the first wound-wire part being wound around the first core leg from one end portion of the both end portions of the first wound-wire part to another end portion of the both end portions of the first wound-wire part; and
two first terminal parts extended from the both end portions of the first wound-wire part, respectively, in a third direction perpendicular to the first direction and the second direction,
the second coil includes:
a second wound-wire part having both end portions, the second wound-wire part being wound around the second core leg from one end portion of the both end portions of the second wound-wire part to another end portion of the both end portions of the second wound-wire part; and
two second terminal parts extended from the both end portions of the second wiring wire part, respectively, in the third direction,
the second coil has a same shape and a same dimension as the first coil,
the both end portions of the first wound-wire part are positioned at both edges of the first wound-wire part in the first direction, respectively,
the both end portions of the second wound-wire part are respectively positioned at both edges of the second wound-wire part in the first direction, respectively, and
the two first terminal parts face the two second terminal parts across the third core leg.

2. The reactor of claim 1, wherein:
the first coil and the second coil constitute a coil part, and
the coil part has two-fold rotational symmetry about an axis that passes between the first coil and the second coil and that is perpendicular to the first direction.

3. The reactor of claim 1, wherein the core further includes:
a first connection part connected to respective one ends of the first leg, the second leg, and the third core leg along the first direction, and
a second connection part connected to respective another ends of the first leg, the second leg, and the third core leg, along the first direction.

4. The reactor of claim 1, wherein:
the both end portions of the first wound-wire part are arranged in the third direction when viewed in the first direction,
the both end portions of the second wound-wire part are arranged in the third direction when viewed in the first direction, and
the first coil has translational symmetry with respect to the second coil in a translational movement in the second direction.

5. The reactor of claim 4, wherein;
the first core leg has a surface facing the third core leg,
a contour of the surface of the first core leg on a cross section of the first core leg part in a plane perpendicular to the first direction is a curve convex toward the third core leg,
the second core leg has a surface facing the third core leg,
a contour of the surface of the second core leg on a cross section of the second core leg part in the plane is a curve convex toward the third core leg part,
the third core leg has a first surface and a second surface facing the surface of the first core leg and the surface of the second core leg, respectively,
a contour of the first surface of the third core leg on a cross section of the third core leg in the plane is a curve recessed opposite to the first core leg part, and
a contour of the second surface of the third core leg on the cross section of the third core leg part is a curve recessed opposite to the second core leg part.

6. The reactor of claim 5, wherein
the contour of the surface of the first core leg has an arcuate shape,
the contour of the first surface of the third core leg has an arcuate shape concentric with the arcuate shape of the contour of the surface of the first core leg,
the contour of the surface of the second core leg has an arcuate shape, and
the contour of the second surface of the third core leg has an arcuate shape concentric with the arcuate shape of the contour of the surface of the second core leg.

7. The reactor of claim 5, wherein the core further includes:
a first connection part connected to respective one ends of the first leg, the second leg, and the third core leg along the first direction, and
a second connection part connected to respective another ends of the first leg, the second leg, and the third core leg along the first direction.

8. The reactor of claim 1, further comprising:
a first input terminal connected to one of the two first terminal parts of the first coil;
a second input terminal that is connected to one of the two second terminal parts of the second coil;
a first output terminal that is connected to another of the two first terminal parts of the first coil; and a second output terminal that is connected to another of the two second terminal parts of the second coil.

9. The reactor of claim 1, wherein one of the two first terminal parts of the first coil and one of the two second terminal parts of the second coil are configured to be connected to a first external circuit, and another of the two first terminal parts of the first coil and another of the two second terminal parts of the second coil are configured to be connected to a second external circuit.

10. The reactor of claim 1, wherein the two first terminal parts are positioned opposite to the second coil with respect to the first center axis when viewed in a direction perpendicular to the first direction and the second direction, and the two second terminal parts are positioned opposite to the first coil with respect to the second center axis when viewed in the direction perpendicular to the first direction and the second direction.

11. A circuit comprising:

the reactor of claim 1; and a circuit board connected to the two first terminal parts of the first coil of the reactor and the two second terminal parts of the second coil of the reactor.

12. The circuit of claim 11, wherein the two first terminal parts are positioned opposite to the second coil with respect to the first center axis when viewed in a direction perpendicular to the first direction and the second direction, and the two second terminal parts are positioned opposite to the first coil with respect to the second center axis when viewed in the direction perpendicular to the first direction and the second direction.

13. The reactor of claim 1, wherein the core further includes:

a first connection part connected to respective one ends of the first leg, the second leg, and the third core leg along the first direction, and a second connection part connected to respective another ends of the first leg, the second leg, and the third core leg along the first direction.

* * * * *